(12) United States Patent
Giese et al.

(10) Patent No.: US 12,014,487 B2
(45) Date of Patent: Jun. 18, 2024

(54) METHOD AND SYSTEM FOR FAULT RECOGNITION IN A HEARING AID

(71) Applicant: SIVANTOS PTE. LTD., Singapore (SG)

(72) Inventors: Ulrich Giese, Fuerth (DE); Eva Droste, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 422 days.

(21) Appl. No.: 17/386,888

(22) Filed: Jul. 28, 2021

(65) Prior Publication Data

US 2022/0036532 A1 Feb. 3, 2022

(30) Foreign Application Priority Data

Jul. 28, 2020 (DE) ...................... 10 2020 209 509.4

(51) Int. Cl.
*G06T 7/00* (2017.01)
*G01N 21/88* (2006.01)
*G06T 7/70* (2017.01)
*H04R 25/00* (2006.01)

(52) U.S. Cl.
CPC ......... *G06T 7/001* (2013.01); *G01N 21/8851* (2013.01); *G06T 7/70* (2017.01); *H04R 25/00* (2013.01); *G01N 2021/8887* (2013.01); *G06T 2207/20081* (2013.01)

(58) Field of Classification Search
CPC . G06T 7/001; G06T 7/70; G06T 2207/20081; G06T 2207/30108; G06T 7/0002; G01N 21/8851; G01N 2021/8887; H04R 25/00; H04R 25/30; H04R 25/65; H04R 25/652; H04R 2499/01

USPC ........................................................ 382/141
See application file for complete search history.

(56) References Cited

U.S. PATENT DOCUMENTS

| 10,614,566 B2 | 4/2020 | Watanabe |
| 10,785,580 B2 | 9/2020 | Aschoff et al. |
| 10,916,005 B2 * | 2/2021 | Avrahami ............... G06F 30/00 |
| 2021/0073962 A1 * | 3/2021 | Wolf .................... G01M 13/021 |

FOREIGN PATENT DOCUMENTS

| CN | 101750033 | * | 6/2010 | ............. A01K 43/08 |
| DE | 60105577 | * | 2/2005 | ........... H04R 25/305 |
| DE | 102017219244 A1 | | 5/2018 | |
| DE | 102017108501 | * | 10/2018 | ......... G01N 29/4418 |
| DE | 102017222964 A1 | | 6/2019 | |

(Continued)

*Primary Examiner* — Jerome Grant, II
(74) *Attorney, Agent, or Firm* — Laurence A. Greenberg; Werner H. Stemer; Ralph E. Locher

(57) ABSTRACT

A fault recognition in a hearing aid of a user includes providing an actual image of a component of the hearing aid and comparing the actual image with reference images. An analysis unit carries out an image comparison, in which the actual image is compared to one or a plurality of reference images, which each show the component in a state, of which it is previously known whether the component is faulty or faultless. The analysis unit determines as a state of the component of the actual image that state which is assigned to the reference image which is most similar to the actual image. This recognizes whether the component is faulty or faultless. A system has an analysis unit that is configured to carry out the method.

16 Claims, 5 Drawing Sheets

(56) References Cited

FOREIGN PATENT DOCUMENTS

| | | | | |
|---|---|---|---|---|
| DE | 102018202429 B3 | 6/2019 | | |
| EP | 3435689 A1 | 1/2019 | | |
| JP | 2002323458 | * | 11/2002 | ........... G01N 21/956 |

* cited by examiner

METHOD AND SYSTEM FOR FAULT RECOGNITION IN A HEARING AID

CROSS-REFERENCE TO RELATED APPLICATION

This application claims the priority, under 35 U.S.C. § 119, of German patent application DE 10 2020 209 509.4, filed Jul. 28, 2020; the prior application is herewith incorporated by reference in its entirety.

BACKGROUND OF THE INVENTION

Field of the Invention

The invention relates to a method for fault recognition in a hearing aid and a system.

Hearing aids are often used to care for a hearing-impaired user. For this purpose, the hearing aid has a microphone which records sound from the surroundings and generates an electrical input signal. This signal is supplied to a signal processing unit of the hearing aid for modification. The signal processing unit is preferably a part of the control unit. The modification is carried out in particular on the basis of an individual audiogram of the user, which is associated with the hearing aid, so that an individual hearing deficit of the user is compensated for. The signal processing unit outputs an electrical output signal as a result, which is then converted back into sound via a receiver of the hearing aid and output to the user.

A hearing aid is susceptible to faults in a variety of ways. A hearing aid is typically assembled from a large number of individual components, which sometimes are also selected or adapted individually for the respective user of the hearing aid. It is problematic if an incorrect component was unknowingly or inadvertently selected, which is not provided for the user. Furthermore, individual components wear out in the course of the use of the hearing aid, which is also problematic. The user is often a layperson, who cannot readily and reliably determine the proper state of the components of the hearing aid. The user is under certain circumstances not capable of properly repairing or maintaining his or her hearing aid.

A method for adapting parameters of a hearing system is described in the commonly assigned U.S. Pat. No. 10,785,580 B2 and its counterpart German Patent No. DE 10 2018 202 429 B3. A component for acoustic coupling to the ear of a hearing aid wearer is attached to a hearing aid device. An image of the component used for the acoustic coupling is recorded by means of a camera and the product identity of the component is identified on the basis of the recorded image.

A device for a hearing instrument is described in European published patent application EP 3 435 689 A1. An identification unit identifies a property of the hearing instrument and a monitoring unit monitors a configuration process for the hearing instrument based on the property.

BRIEF SUMMARY OF THE INVENTION

It is accordingly an object of the invention to provide a method and system which overcomes the above-mentioned disadvantages of the heretofore-known devices and methods of this general type and which provides for a fault recognition that can be carried out as easily as possible in the hearing aid. The method is in particular to be suitable for everyday use and is to enable a user of the hearing aid to recognize a fault on the hearing aid substantially or completely independently.

With the above and other objects in view there is provided, in accordance with the invention, a method for fault recognition in a hearing aid of a user, the method comprising:
providing an actual image of a component of the hearing aid;
carrying out an image comparison with an analysis unit, by comparing the actual image with one or a plurality of reference images, wherein each reference image shows the component in a state that is previously known to show the component as being faulty or as being faultless; and
determining with the analysis unit that the component, as shown in the actual image, is in a state which is assigned to the reference image that is most similar to the actual image, to thereby recognize whether the component is faulty or the component is faultless.

The hearing aid is generally used to compensate for hearing loss, but the invention also pertains more generally to hearing devices without specific hearing loss compensation.

One core concept of the invention is in particular a fault recognition by way of an image comparison.

The method is used for fault recognition in a hearing aid. In the method, an actual image of a component of the hearing aid is provided. The component is alternatively also referred to as a part. Furthermore, in the method an analysis unit carries out an image comparison, in which the actual image is compared to one or multiple reference images. The reference images each show a component in a state of which it is previously known whether the component is faulty or faultless. The component of a respective reference image is generally a component of a hearing aid, but not necessarily a component especially of the hearing aid of the user. In the scope of the method, the analysis unit determines, as a state of the component of the actual image, the state which is associated with the reference image which is most similar to the actual image, so that it is recognized whether the component is faulty or faultless.

If a component is faultless, then its state is faultless and the actual image or the reference image of this component shows it in the faultless state. In contrast, if a component is faulty, then its state is faulty and the actual image or the reference image of this component shows it in the faulty state. In particular, a component in the faulty state has a fault. This fault is expediently previously known, however, it is initially fundamentally sufficient as such to recognize that a component is faulty without knowing the fault more precisely.

The hearing aid is preferably used to care for a hearing-impaired user. For this purpose, the hearing aid has a microphone which records sound from the surroundings and generates an electrical input signal. This is supplied to a signal processing unit of the hearing aid for modification. The modification is carried out in particular on the basis of an individual audiogram of the user, which is associated with the hearing aid, so that an individual hearing deficit of the user is compensated for. The signal processing unit outputs an electrical output signal as a result, which is then converted back into sound via a receiver of the hearing aid and output to the user.

During the intended use, the hearing aid is worn by the user in or on the ear. In one embodiment, the hearing aid is a binaural hearing aid, having two individual devices, which are worn on different sides of the head. A monaural embodiment is also possible, however. During the method for fault recognition, the hearing aid is expediently not worn by the user, but rather is taken off. However, an application of the method while the hearing aid is worn by the user is also possible and is also advantageous.

The invention is based in particular on the observation that an adaptation of a hearing aid to the individual requirements of a user takes place at a specialist, for example an acoustician or a so-called "hearing care professional," who lets his or her experiences be incorporated during the adaptation to avoid or solve typical problems. For example, the selection of the most optimum possible hearing aid and its components such as receiver tube, earpiece, housing shape, receiver, and the like already take place based on experience. A non-optimal, i.e., faulty selection would accordingly impair the utility of the hearing aid for the user. However, also in the further course of things, a fault recognition, i.e., an identification of faults, e.g., defects, soiling, damage, wear, incorrect assembly, and the like is frequently carried out by a specialist based on experience. A fault is generally a faulty selection of a component, a faulty connection of a component to another component, or a fault occurring over time as a result of incorrect operation, cleaning, or assembly. Specific examples of faults are soiling with cerumen due to deficient cleaning of the hearing aid, incorrect assembly after cleaning of the hearing aid, incorrect insertion of a battery into the hearing aid, defect of a component, and the like. If a fault is not recognized or not recognized correctly, depending on the specific fault, this has corresponding negative consequences for the user of the hearing aid.

In this case, many faults can often be remedied in a simple manner and a correction can possibly be carried out easily by the user himself or herself with instructions. However, a preceding recognition of the fault which is as reliable and correct as possible is problematic. This cannot be readily provided by the user himself or herself. The present invention begins here and provides a solution by means of which the user is assisted in the fault recognition. In the core concept, an automated diagnosis of one or multiple components of the hearing aid is carried out by means of an image comparison and the fault recognition by a specialist is thus automated. Complex inspections by a specialist are thus avoided, the user does not have to explicitly seek out the specialist, but rather can identify faults on the hearing aid on location and independently. Seeking out a specialist is thus not necessary and is advantageously dispensed with. A fault recognition can be carried out by the user alone without a specialist. In particular, time savings and higher user satisfaction result in this way. Moreover, the solution described here is advantageous if an adaptation of the hearing aid is not performed by a technician but rather by a service provider untrained in this regard, who is then assisted accordingly during the adaptation. In this way, dissatisfaction, complaints, and returns can be reduced.

One advantage of the invention is thus in particular that the user does not necessarily have to contact or seek out a specialist for fault recognition to recognize in particular simple, minor, and everyday faults on the hearing aid. The fault recognition by the specialist is replaced here by an automated method which can be initiated in particular by the user himself or herself and advantageously does not require participation of a specialist. The experience of the specialist is replaced here by an image comparison of a component to a number of reference images, in which this experience is more or less stored. "A number of" is generally understood as "one or multiple". Preferably, a large number of reference images is provided. An actual image is recorded by a specific component to be checked, to then compare it in the scope of the method described here to stored reference images of this or other, in particular similar components and thus to recognize the state of the component to be checked with sufficient probability on the basis of a similar and previously known case.

The actual image is preferably produced, i.e., taken, by way of a camera, either as part of the method or separately therefrom. The camera is suitably operable by the user, so that the user can himself or herself trigger the camera and this thus then produces the actual image. The camera is, for example, a web cam or a camera of an auxiliary device. A suitable auxiliary device is a smartphone. The component for which a fault recognition is to be carried out is shown on the actual image. The actual image does not necessarily exclusively have to show the component, but rather in an embodiment which is also suitable shows multiple components in particular connected to one another or even the entire hearing aid. The component is, for example, a housing of the hearing aid, an earpiece, a sound tube, a connecting line, a receiver, or a combination thereof. In particular, the statements with respect to a sound tube also apply to a connecting line and vice versa. In principle, a single actual image is already sufficient, however, in an advantageous embodiment, multiple actual images are recorded, in particular as a video, so that the actual images in particular show the component in different views. The fault recognition becomes more accurate in this way.

The reference images are preferably stored in a database, which is a part of the analysis unit or which the analysis unit accesses, for example, via WLAN or the Internet. A respective reference image shows a possible component or assembly of multiple components of a hearing aid. In this case, corresponding reference images are preferably also stored for respective different embodiments for a respective component. The reference images are, for example, previously produced images of real components in diverse states. Moreover, an item of information is stored for each reference image, which is linked to the reference image and indicates whether the component or assembly of components shown on the reference image is faultless or faulty, and in the latter case expediently in addition which fault specifically exists. The database is accordingly a database of reference states which are previously known and are used as the basis for the fault recognition in the specific case of the actual image.

In the analysis unit, the method steps which are carried out by the analysis unit are implemented in particular by programming or circuitry or a combination thereof. For example, for this purpose the analysis unit is designed as a microprocessor or as an ASIC or as a combination thereof. The analysis unit is generally a part of a computer, for example of a smartphone or generally an auxiliary device which is connectable to the hearing aid via a data connection. In another suitable embodiment, the analysis unit is a part of the hearing aid. In another suitable variant, the analysis unit is a part of a charging device for the hearing aid. The charging device and the hearing aid each also represent a computer in this meaning.

The actual image is supplied to the analysis unit and is evaluated by it in the context of the image comparison with respect to a possible fault. The similarity is expediently ascertained on the basis of methods known per se for image recognition. It is not essential in the present case how the image comparison is specifically carried out. It is only important that the reference image which is most similar to the actual image is found on the basis of a suitable measure for quantification of the similarity of the actual image to a respective reference image. This reference image most probably indicates the actual state of the component on the actual image, so that on the basis of the information which is linked to the reference image, the state of the component is concluded with corresponding probability, i.e., whether or not it is faultless. The reference images accordingly represent a collection of possible states from which the most probable is selected by the analysis unit during the image comparison. In this way, simple and automated fault recognition is implemented, which does not require action of a specialist and which advantageously can be initiated by the user alone.

The reference images do not necessarily have to show faulty states. In one suitable embodiment, at least one of the reference images is an image of the component without a fault and thus in a faultless state, so that in the event of a correspondence of the actual image to this reference image, it is recognized that no fault is present and the component is identified as faultless. In this way, it is positively established that no fault exists.

Nonetheless, it is reasonable to alternatively or additionally use those reference images which show a faulty state. In one suitable embodiment, at least one of the reference images is an image of the component having a specific fault and thus in a faulty state, so that in the event of a correspondence of the actual image to this reference image, it is recognized that a fault exists, and the component is identified as having this fault. Accordingly, the fault is specifically determined by the image comparison which the component on the actual image has, so that the user can then accurately correct the faulty state.

The method may also advantageously be used to check whether one component of multiple possible components was selected correctly and suitably for the user. Accordingly, in one suitable embodiment, a target component for the user is individually selected from a set of different components and at least one of the reference images is an image of the target component, so that it is recognized by the analysis unit that the component is faulty if it does not correspond to the target component. For example, the component is a sound tube or an earpiece which was selected depending on the shape of the ear or the auditory canal of the user from a set of multiple and different sound tubes or earpieces for various shapes of ears or auditory canals. The target component is communicated to the analysis unit as a specification or is already stored therein, for example, in the scope of a prior adaptation at a specialist. An embodiment is also suitable in which the component is depicted jointly with the user, especially his ear or auditory canal, for example in the inserted or attached state, on the actual image. For this purpose, the target component is expediently selected on the basis of the user in the actual image in particular in the scope of an automatic selection and communicated to the analysis unit as a specification. In this case, for example, the one matching best is selected from multiple components and the reference images thereof and the associated reference image is used as the specification. It is then recognized by the analysis unit by way of the image comparison whether the component on the actual image also actually corresponds to the specification, for example, the specification of a specialist or a specification ascertained automatically on the basis of the actual image. If this is not the case, the component is faulty for the user in the individual case.

In one suitable embodiment, the component is an earpiece for insertion into an auditory canal of the user. The earpiece is a so-called dome in one expedient embodiment, which typically consists of a material which is soft in such a way that it deforms upon insertion into the auditory canal and adapts to its shape. The earpiece is in particular placed at the end on a receiver or a sound tube and inserted thereon into the auditory canal. Depending on the type of the hearing aid and shape of the auditory canal, the earpieces sometimes significantly differ from one another. The earpiece is often individually selected for a user. Different earpieces are also sometimes assigned to the two associated individual devices especially in the case of a binaural hearing aid, so that it is advantageously recognized here by means of the method whether the assigned earpiece is also attached to a respective individual device. A left-right confusion of the earpieces is thus advantageously avoided.

One preferred application for the above-mentioned embodiment for checking the selection of a component is that a user is provided with multiple different earpieces with the hearing aid, of which, however, especially one of them is to be used. For example, the optimum setting of the signal processing unit of the hearing aid is dependent on the earpiece. The analysis unit then ensures by way of the described image comparison that the user also actually uses the provided earpiece. For example, the analysis unit prompts the user to connect the earpiece to the hearing aid and before or after this to produce an actual image of this earpiece. The analysis unit then recognizes by way of the image comparison whether the user has faultlessly selected the required earpiece or whether the selection of the user is faulty.

In one suitable embodiment, the component is a housing of the hearing aid and the housing has a microphone opening, so that it is recognized by the analysis unit whether or not the microphone opening is clogged. One or multiple reference images thus show the housing having a free microphone opening or having a clogged microphone opening or a combination thereof. A microphone opening clogs in the course of the use, for example, due to inadequate cleaning of the hearing aid by the user. In the event of a clogged microphone opening, i.e., in the clogged state, the housing is faulty and operation of the hearing aid is not optimal under certain circumstances. Vice versa, in the case of a free microphone opening, i.e., in a non-clogged, free state, the housing is faultless at least in this aspect.

In one suitable embodiment, soiling of the component, in particular with cerumen, is a fault which is recognized in that one of the reference images is an image of the component in the clean or soiled state. In the faultless state, the component is clean, in the faulty state, in contrast, it is soiled. The reference images are then images of components which are soiled with cerumen, or which are clean, wherein the latter is particularly advantageous because of the sometimes strongly varying soiling. The recognition of soiling is advantageous in particular in the case of an earpiece, since this is typically particularly affected by soiling, especially with cerumen.

In conjunction with the recognition of soiling as in the above-described embodiment, an embodiment is advantageous in which the analysis unit, after cleaning of the component by the user, prompts the user to record an actual image of the component so that then the analysis unit effectively checks the correct cleaning of the component by the user in the scope of the fault recognition.

In one suitable embodiment, damage to the component is a fault which is recognized in that one of the reference images is an image of the component in the undamaged or damaged state. Damage occurs, for example, in the course of time on an earpiece or a sound tube. A damaged component has to be replaced immediately or soon, so that a corresponding fault recognition is advantageous here.

In one suitable embodiment, an incorrect or defective connection, also referred to as an attachment, of the component to another component of the hearing aid is a fault which is recognized in that one of the reference images is an image of the two components having faultless or faulty connection. The analysis unit thus accordingly determines whether the component is attached in a faultless or faulty manner. This is advantageous in particular for an earpiece or a sound tube or the like. The connection of the component to another component is checked in particular in that multiple components or even the entire hearing aid are shown in each case on the actual image and accordingly on one or multiple reference images.

One application of the above-mentioned embodiment is a check as to whether a battery for the hearing aid is correctly inserted into a battery compartment of the hearing aid. The battery is then a component of the hearing aid, the arrangement thereof relative to the battery compartment is then a connection which is accordingly faulty or faultless.

The fault recognition by means of image comparison by the analysis unit is initiated by the user himself or herself or automatically from time to time or at specific points in time or by a specialist, for example, in the scope of remote maintenance, or a combination thereof. For example, the method can be initiated from an app on a smartphone or another auxiliary device by the user or automatically.

In one suitable embodiment, for the repeating fault recognition, the analysis unit repeatedly prompts the user to record and provide an actual image. This is based on the consideration that it is advantageous to check the state of the component from time to time. "Repeating" is understood in one embodiment as carrying out the method multiple times at fixed time intervals or at specific points in time, for example, every 24 hours or once a week or when the hearing aid is put on or taken off or the like. A regular check of the component for possible faults is thus implemented.

An embodiment is also advantageous in which the method is carried out in the context of troubleshooting (i.e., fault recognition and elimination), which is requested by the user, for example by means of an app on a smartphone or another auxiliary device. In one suitable embodiment, for this purpose the actual image is compared to the one or the multiple reference images after an input has been received from the user by means of a questionnaire which indicates that a problem with the hearing aid exists. The analysis unit preferably outputs the questionnaire to the user as soon as it has been indicated by a corresponding input or query that this user has a problem with the hearing aid. The questionnaire contains one or multiple questions which are expediently designed in such a way that it is determined in the lead up to the image recognition which component is probably faulty, so that then an actual image is deliberately requested of this component. Moreover, the fault is also already expediently narrowed down by one or multiple questions, so that only a subset of the reference images is taken into consideration which relate to this fault.

The method is particularly expedient if in addition to the recognition of the fault, its correction by the user is also enabled, thus if a fault elimination follows the fault recognition. In one suitable embodiment, for this purpose if it has been recognized that the component is faulty, an instruction for the correction of the state of the component is output to the user. The instruction is selected accordingly in dependence on the component and the fault, for example, a suitable instruction is assigned to each reference image which shows a component in a faulty state, which is then output to the user, for example, in that it is displayed on a display screen of an auxiliary device. The instruction comprises, for example, a direction to clean the component or send it into a service center or an instruction for how the component is to be cleaned or repaired.

In one particularly preferred embodiment, the actual image is produced by means of a camera which is a part of a charging device for the hearing aid, and the actual image is automatically produced when the hearing aid is connected to the charging device for charging, preferably when the hearing aid becomes connected to the charging device for charging. The charging device is preferably a charging cradle. The charging device is expediently designed in such a way that the hearing aid is inserted during charging into the charging device in such a way that an earpiece of the hearing aid can be recorded by the camera. In one advantageous embodiment, an actual image of the earpiece is then produced when the hearing aid is inserted and the image comparison is then carried out using this actual image to ascertain whether the earpiece is in a faulty or a faultless state, in particular whether or not the earpiece is soiled. In this way, a fault recognition is carried out automatically in particular when the hearing aid is taken off at the end of the day and a corresponding message is expediently output to the user in the event of a fault.

The method profits to a particular extent from the use of a learning machine, by which the recognition is automatically improved with time. The learning machine is either a part of the analysis unit or is formed separately therefrom. The learning machine is expediently a part of the system. A learning machine is especially used profitably at two points in the present case, which are fundamentally independent of one another: In one suitable embodiment, a learning machine is used for the comparison of the actual image to the one or the multiple reference images. Alternatively or additionally, in one suitable embodiment, additional reference images are produced by means of a learning machine. In a combination, either two separate learning machines are used or one single learning machine is used for both applications at the same time.

If a learning machine is used for comparing the actual image to the one or the multiple reference images, it is expediently designed in such a way that it automatically identifies suitable features in the actual image when the method is carried out repeatedly to compare this actual image to the reference images. The learning machine is thus used for identifying features which characterize the component in the actual image and in a reference image. These features are not necessarily previously known, but rather are in particular previously learned by the learning machine in a training method. For this purpose, a large number of reference images having components in a known state are transferred as training data to the learning machine. On the basis of the training data, the learning machine identifies characteristic features for a respective component in a respective state. These features are then used during the image comparison of the analysis unit to determine the similarity of the actual image to a reference image.

If additional reference images are produced by means of a learning machine, it stores an actual image for the component of which the state has been determined as an additional reference image for such a component in just this state. The database is thus progressively expanded with further reference images, so that the fault recognition progressively becomes more accurate.

An embodiment is expedient in which multiple analysis units jointly access the database, so that different users also having, under certain circumstances, different hearing aids can carry out a fault recognition on the basis of shared reference images. It is particularly advantageous if multiple analysis units, as described above, progressively add new reference images to the database by means of a learning machine.

The system according to the invention has an analysis unit as described above, which is designed to carry out a method as also described above. The system is suitably an auxiliary device or a hearing aid as described above. If the system is designed to execute one or multiple method steps, in particular the analysis unit is designed accordingly for this purpose.

It should be noted that all statements in conjunction with the method also apply accordingly to the system and vice versa. When method steps of the method are described in the specification, advantageous embodiments for the system result in particular in that it is designed to execute one or multiple of those method steps.

The objects of the invention are also achieved by a computer program product, containing an executable program, which automatically executes the method as described above when it is installed on a computer. The above statements on the method and the system also apply accordingly to the computer program product and vice versa. An example of a computer program product is an app for a smartphone or software for a hearing aid or a charging device.

Other features which are considered as characteristic for the invention are set forth in the appended claims.

Although the invention is illustrated and described herein as embodied in a method and system for fault recognition in a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
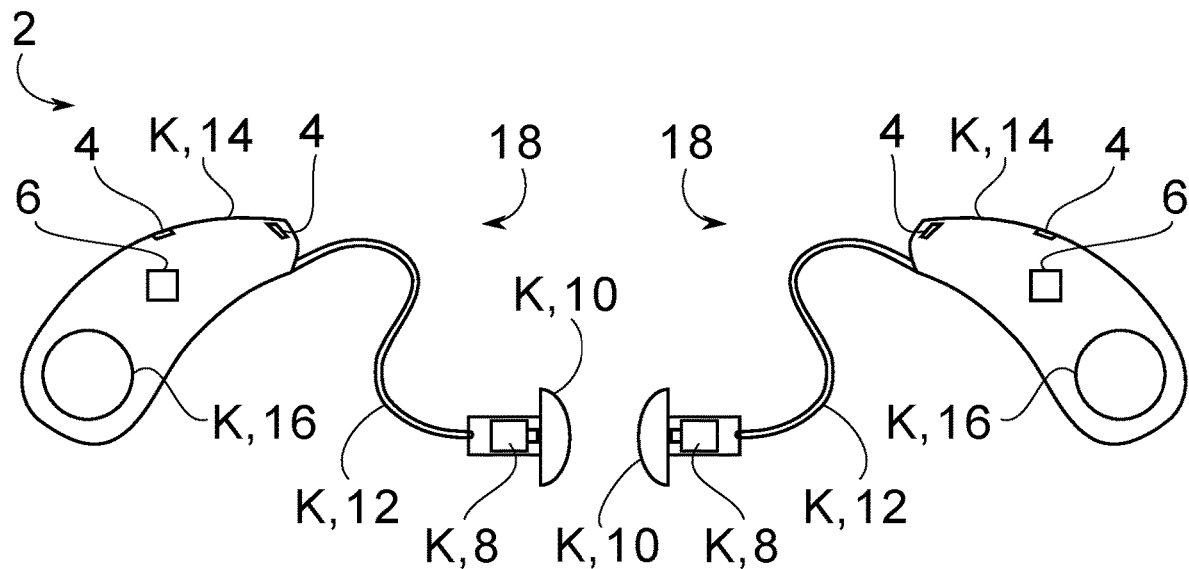
FIG. 1 shows a hearing aid.

Referring now to the figures of the drawing in detail and first, in particular, to FIG. 1 thereof, there is shown an exemplary embodiment of a hearing aid 2, which is used to care for a hearing-impaired user. The illustrated hearing aid is a BTE (behind-the-ear) hearing device with a so-called hook and a receiver for placement in the ear canal. For this purpose, the hearing aid 2 has a microphone, which is arranged behind a microphone opening 4 and which records sound from the surroundings and generates an electrical input signal. This signal is supplied for modification to a signal processing unit 6 of the hearing aid 2. The modification takes place here on the basis of an individual audiogram of the user, which is assigned to the hearing aid 2, so that an individual hearing deficit of the user is compensated for. The signal processing 6 outputs an electrical output signal as a result, which is then converted back into sound via a receiver 8 of the hearing aid 2 and is output to the user. During intended use, the hearing aid 2 is worn by the user in or on the ear.

Furthermore, the hearing aid 2 has an earpiece 10, which is a so-called dome here. The receiver 8 and the earpiece 10 are connected via a connecting line 12 to a housing 14 of the hearing aid. In a variant (not shown), the receiver 8 is housed in the housing 14 and the earpiece 10 is connected to the receiver 8 in the housing 14 via a sound tube instead of the connecting line 12. The statements on the connecting line 12 also apply similarly to a sound tube and vice versa. In addition, a battery 16 is housed in a battery compartment in the housing 14.

The hearing aid 2 shown is a binaural hearing aid 2, having two individual devices 18, which are worn on different sides of the head. A monaural embodiment having only one individual device 18 is also possible, but is not explicitly shown. During the method for fault recognition, the hearing aid 2 is not worn by the user in the present case, but is taken off. An application of the method while the hearing aid 2 is worn by the user is also possible, but is not explicitly shown.

Figure 2:
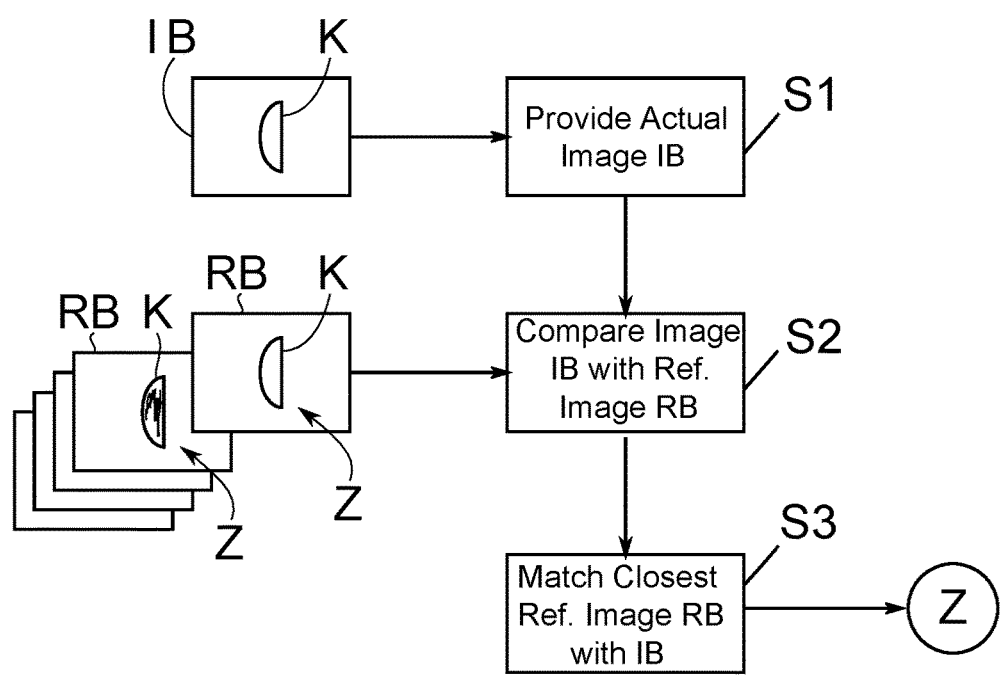
FIG. 2 is a flowchart showing a method for fault recognition.

A method for fault recognition in a hearing aid 2 is shown in FIG. 2, for example, in a hearing aid 2 according to FIG. 1 and by way of example having an earpiece 10 as component K. In the method, in a first step S1, an actual image IB of the component K is provided. Furthermore, during the method, in a second step S2, an analysis unit 20 carries out an image comparison, in which the actual image IB is compared to one or as shown here to multiple reference images RB. The reference images RB each show a component K in a state Z, of which it is previously known whether the component K is faulty or faultless. Two different states Z are shown by way of example in FIG. 2, once the component K is faultless, clean here, and another time it is faulty, soiled here. Further reference images RB are only indicated in FIG. 2. The component K of a respective reference image RB is generally a component K of a hearing aid 2, but not necessarily a component K especially of the hearing aid 2 of the user. In the scope of the method, the analysis unit 20 determines, in a third step S3, as a state Z of the component K of the actual image IB, the state Z which is assigned to the reference image RB which is most similar to the actual image IB, so that it is recognized whether the component K is faulty or faultless. In the situation shown in FIG. 2, the analysis unit 20 detects that the component K is faulty, since the greatest similarity exists with the reference image RB, which shows a faultless component K.

A faulty selection of a component K or a fault occurring with time because of incorrect operation, cleaning, or assembly would negatively affect the use of the hearing aid 2 for the user. The method presented here avoids this by way of a fault recognition by means of an image comparison. Many faults can often be eliminated in a simple manner and a correction can possibly also be carried out easily by the user himself or herself with an instruction A. By means of the method described here, the user is assisted in the identification of a faulty component K. In the core concept, an automated diagnosis of one or multiple components K of the hearing aid 2 is carried out by means of the image comparison. The user does not explicitly have to seek out a specialist, but rather can identify faults on the hearing aid 2 on location and independently, especially simple, minor, and everyday faults. The fault recognition described here can be initiated by the user himself or herself and does not require participation of a specialist.

Figure 3:
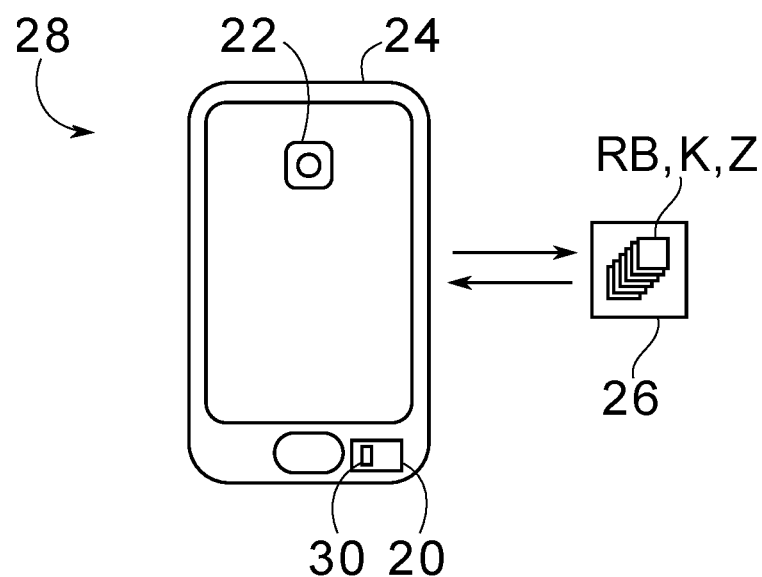
FIG. 3 shows a system.

The actual image IB is produced in the present case by means of a camera 22, either as part of the method or separately therefrom and either by the user or automatically. The camera 22 is, for example, a web cam or, as shown in FIG. 3, a camera 22 of an auxiliary device 24, which is specifically a smartphone in FIG. 3. The camera 22 is shown by dashed lines in FIG. 3, since it is located on a rear side of the auxiliary device 24.

The component K is shown on the actual image IB, for which a fault recognition is to be carried out. The actual image IB does not necessarily have to show exclusively the component K, but in an embodiment which is also possible shows multiple components K, which are connected to one another, for example, or even the entire hearing aid 2. The component K is, for example, as can be seen in FIG. 1, a housing 14 of the hearing aid 2, an earpiece 10, a sound tube, a connecting line 12, a receiver 8, or a combination thereof. In principle, a single actual image IB is already sufficient, however, in one embodiment (not explicitly shown), multiple actual images IB are recorded, in particular as a video, so that the actual images IB show the component K, for example, in different views.

The reference images RB are preferably stored in a database 26, which is a part of the analysis unit 20 or which the analysis unit 20 accesses as shown, for example, in FIG. 3, for example via WLAN or via the Internet. A respective reference image RB shows a possible component K or assembly of multiple components K of a hearing aid 2. Corresponding reference images RB are also stored for respective different embodiments for a respective component K. In addition, an item of information is stored for each reference image RB, which is linked to the reference image RB and indicates the state Z of the component K, i.e., whether the component K shown on the reference image RB is faultless or faulty and, in one refinement, additionally which specific fault exists. The database 26 is accordingly a database 26 of reference states, which are previously known and are used as the basis for the fault recognition in the specific case of the actual image IB.

Figure 4:
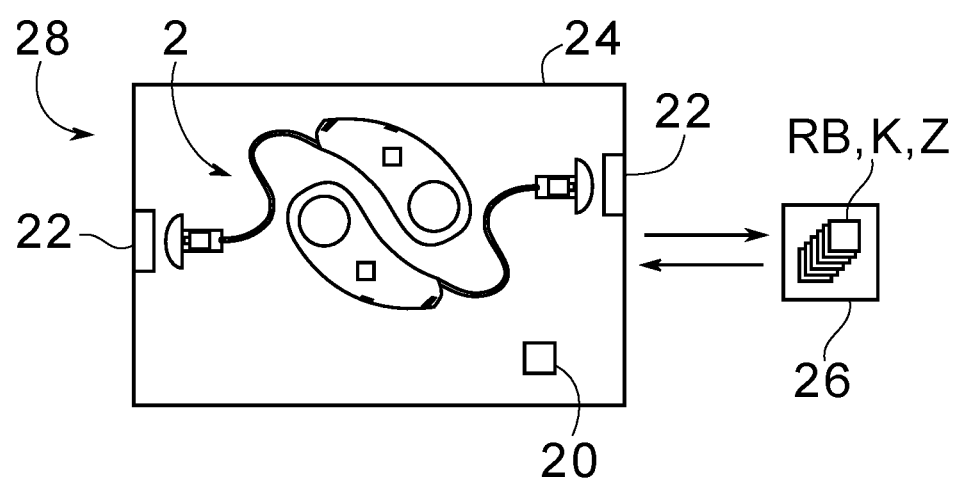
FIG. 4 shows another system.

The analysis unit 20 is generally a part of a computer, for example as shown in FIG. 3 of a smartphone or generally an auxiliary device 24, which is connectable to the hearing aid 2 via a data connection (not explicitly shown), for example via Bluetooth. In one variant, the analysis unit 20 is a part of the hearing aid 2. In another variant, which is shown in FIG. 4, the analysis unit is a part of a charging device, which is an auxiliary device 24. In FIGS. 3 and 4, the respective auxiliary device 24, with the analysis unit 20, forms a system 28, in which the analysis unit 20 is designed to carry out the method described here.

In the exemplary embodiment of FIG. 4, the actual image IB is produced by means of a camera 22, which is part of a charging device for the hearing aid 2, and the actual image IB is automatically produced when the hearing aid 2 is connected to the charging device for charging, especially here when the hearing aid 2 becomes connected to the charging device for charging. The charging device is generally an auxiliary device 24 and in FIG. 4 especially a charging cradle. The charging device is designed in such a way that the hearing aid 2 is inserted into the charging device during charging in such a way that an earpiece 10 of the hearing aid 2 can be recorded by the camera 22. When the hearing aid 2 is inserted, an actual image IB of the earpiece 10 is then produced and the image comparison is carried out using this actual image IB to ascertain whether the earpiece 10 is in a faulty or a faultless state Z.

The actual image IB is supplied to the analysis unit 20 and evaluated thereby in the scope of the image comparison with respect to a possible fault. The similarity is ascertained here on the basis of methods for image recognition that are known per se. The reference image RB which is most similar to the actual image IB is found on the basis of a suitable measure for quantification of the similarity of the actual image IB to a respective reference image RB. This reference image RB most probably indicates the actual state Z of the component K on the actual image IB, so that on the basis of the information which is linked to the reference image RB, i.e., here the state Z, the state Z of the component K is concluded with corresponding probability, i.e., whether it is faulty or not. The reference images RB accordingly represent a collection of possible states Z, from which the most probable is selected by the analysis unit 20 upon the image comparison. In this way, an automated fault recognition is implemented.

As is already clear from the example in FIG. 2, the reference images RB do not necessarily have to show faulty states Z, rather in one possible embodiment, at least one of the reference images RB is an image of the component K without a fault and thus in a faultless state Z, so that in the event of a correspondence of the actual image IB with this reference image RB, it is recognized that no fault is present and the component K is identified as faultless. In this way, it is positively established that no fault is present. Nonetheless, it is alternatively or additionally reasonable to use those reference images RB which show a faulty state Z, as may also be seen from FIG. 2. In one possible embodiment, at least one of the reference images RB is then an image of the component K with a determined fault and thus in a faulty state Z, so that in the event of a correspondence of the actual image IB to this reference image RB, it is recognized that a fault exists and the component K is identified as having this fault.

The method may also be used to check whether one component K from multiple possible components K was selected correctly and matching with the user. This is shown by way of example in FIG. 5. A target component S for the user is individually selected from a set of different components K and at least one of the reference images RB is an image of the target component S, so that it is recognized by the analysis unit 20 that the component K is faulty if it does not correspond to the target component S. In the example shown, the component K is an earpiece 10, which was selected in dependence on the shape of the auditory canal of the user from a set of multiple and different earpieces 10 for various shapes of auditory canals. The target component S is communicated to the analysis unit 20 as a specification or is already stored therein, for example, in the scope of a prior adaptation at a specialist. It is then recognized by the analysis unit 20 by the image comparison whether the component K on the actual image IB also actually corresponds to the specification. If this is not the case, the component K is faulty for the user in the individual case.

Figure 5:
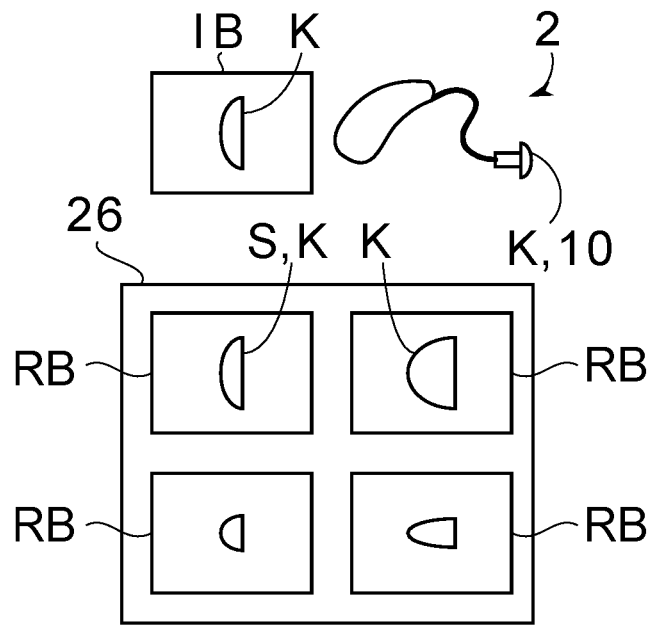
FIG. 5 shows a recognition of a faulty selection.

The earpiece 10 shown here is a so-called dome, which typically consists of a material which is sufficiently soft that it deforms upon insertion into the auditory canal and adapts to its shape. The earpiece 10, as can be seen in FIG. 1, is attached here to the end on the receiver 8 or alternatively a sound tube and inserted thereon into the auditory canal. Depending on the type of the hearing aid 2 and shape of the auditory canal, the earpieces 10 sometimes differ from one another significantly as can be seen in FIG. 5. The earpiece 10 is often individually selected to a high degree for a user.

Figure 6:
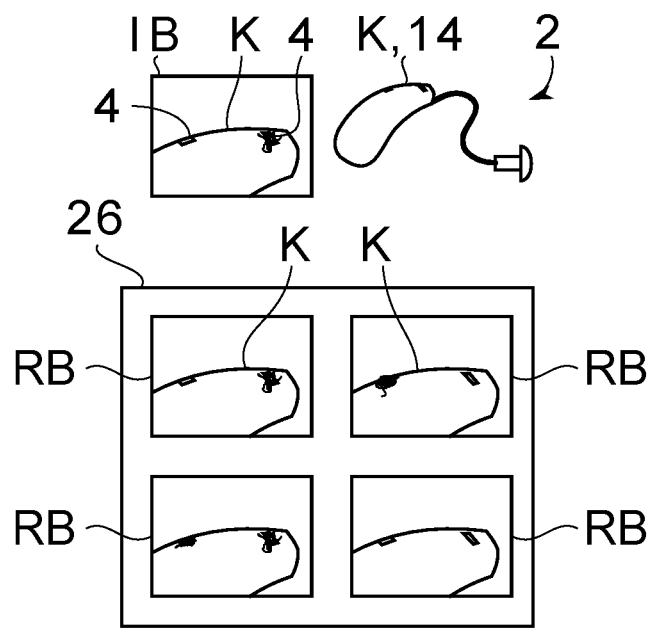
FIG. 6 shows a recognition of a clog.

Another case is shown in FIG. 6, in which the component K is the housing 14 of the hearing aid 2 and wherein it is recognized by the analysis unit 20 whether or not the microphone opening 4 is clogged. One or multiple reference images RB thus show the housing 14 having a free microphone opening 4 or having a clogged microphone opening 4 or a combination thereof. In the case of a clogged microphone opening 4, i.e., in the clogged state Z, the housing 14 is faulty and the operation of the hearing aid 2 is not optimal under certain circumstances. Vice versa, in the case of a free microphone opening 4, i.e., in a non-clogged, free state Z, the housing 14 is faultless at least in this aspect. In the present case, it can even be determined which of the multiple microphone openings 4 is clogged.

In another embodiment, alternatively or additionally a soiling of the component K, in particular with cerumen, is a fault which is recognized in that one of the reference images RB is an image of the component K in the clean or soiled state Z. One example of this is already shown in FIG. 2. In the faultless state Z, the component K, the earpiece 10 here, is clean as shown in the actual image IB and the right reference image RB in FIG. 2, in contrast, in the faulty state Z it is soiled, as can be seen in FIG. 2 in the left reference image RB with explicitly shown earpiece 10. The reference images RB are then generally images of components K which are soiled with cerumen, or which are clean. In a refinement (not explicitly shown) of this embodiment, after cleaning of the component K by the user, the analysis unit 20 prompts the user to record an actual image IB of the component K, so that the analysis unit 20 then effectively checks the correct cleaning of the component K by the user in the scope of the fault recognition.

Figure 7:
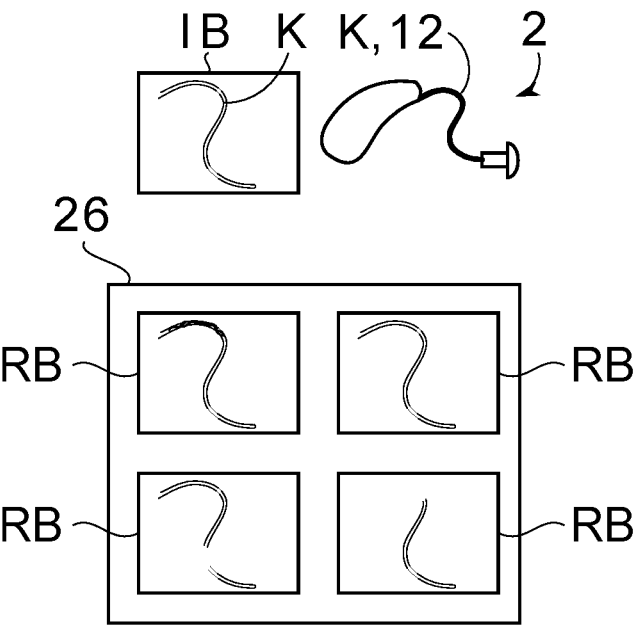
FIG. 7 shows a recognition of damage.

In another embodiment, damage to the component K is a fault which is recognized in that one of the reference images RB is an image of the component K in the undamaged or damaged state Z. Damage occurs, for example, in the course of time on an earpiece 10 or a sound tube. It is shown by way of example in FIG. 7 how damage to the connecting line 12 is recognized.

Figure 8:
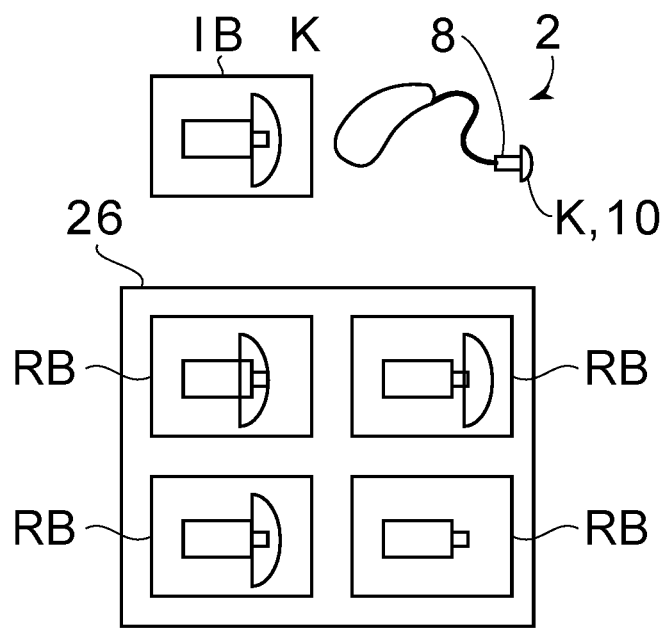
FIG. 8 shows a recognition of a faulty connection.

In another embodiment, an incorrect or defective connection of the component K to another component K of the hearing aid 2 is a fault which is recognized in that one of the reference images R is an image of the two components K with faultless or faulty connection. One example of this is shown in FIG. 8, wherein the connection between earpiece 10 and receiver 8 is monitored. The analysis unit 2 thus accordingly determines whether the component K is attached in a faultless or faulty manner. This is particularly advantageous for an earpiece 10, a connecting line 12, a sound tube, or the like.

Another application (not explicitly shown) of the above-mentioned embodiment is a check as to whether the battery 16 for the hearing aid 2 is correctly inserted into the battery compartment of the hearing aid 2. The battery 16 is then a component K of the hearing aid 2, the arrangement of which relative to the battery compartment is then a connection which is accordingly faulty or faultless.

The fault recognition by means of image comparison by the analysis unit 20 is initiated by the user himself or herself or automatically from time to time or at specific points in time or a combination thereof. For example, the method can be initiated from an app on the smartphone or other auxiliary device 24 by the user or automatically. In one possible embodiment, the analysis unit 20 repeatedly prompts the user to record and provide an actual image IB for the repeating fault recognition. The state Z of the component K is thus checked from time to time, for example, every 24 hours or once a week or when the hearing aid 2 is put on or taken off or the like.

Figure 9:
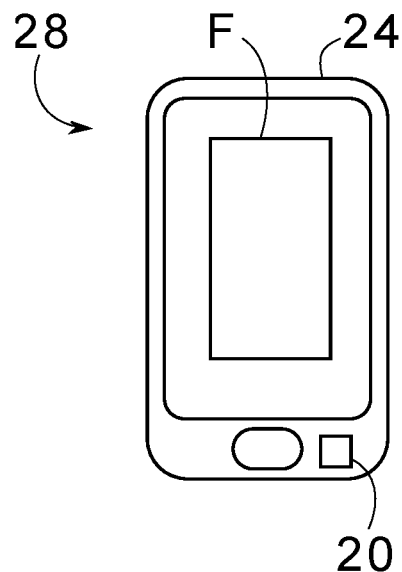
FIG. 9 shows the system from FIG. 4 with a questionnaire.

An embodiment is also possible in which the method is carried out in the scope of troubleshooting which is requested by the user, for example by means of an app on the smartphone or other auxiliary device 24. For example, for this purpose the actual image IB is compared to the one or the multiple reference images RB, after an input has been accepted from the user by means of a questionnaire F which indicates that a problem exists with the hearing aid 2. This is shown by way of example in FIG. 9, which shows an auxiliary device 24 which is a smartphone having a display screen on which the questionnaire F is output. The questionnaire F contains one or multiple questions which are expediently designed in such a way that it is determined in the lead up to the image recognition which component K is probably faulty, so that an actual image IB is then deliberately requested of this component K.

Figure 10:
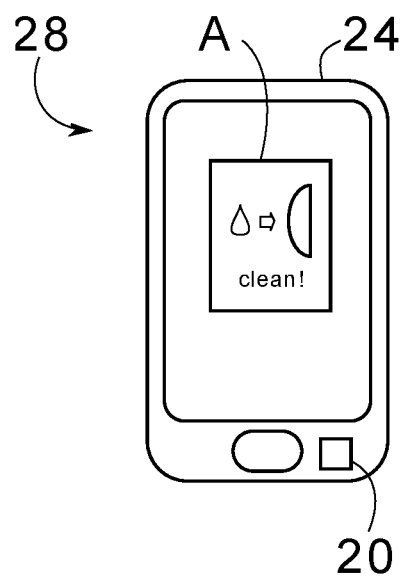
FIG. 10 shows the system from FIG. 4 with an instruction.

In the present case, if it was recognized that the component K is faulty, an instruction A for the correction of the state Z of the component K is also output to the user. The instruction A is accordingly selected in dependence on the component K and the fault, for example, each reference image RB which shows a component RB in a faulty state Z is assigned a suitable instruction A, which is then output to the user, for example, in that it is displayed on a display screen of an auxiliary device 24. One example is shown in FIG. 10, in which based on the recognition of soiling as in FIG. 2, the instruction A is in the form of an instruction to clean the component K, the earpiece 10 here.

The method profits to a particular extent from the use of a learning machine 30, by which the recognition is automatically improved with time. The learning machine 30 is either a part of the analysis unit 20 or is formed separately therefrom. A learning machine 30 is shown as part of the analysis unit 20 of the system 28 by way of example in FIG. 3. A learning machine 30 is especially used profitably at two points in the present case, which are fundamentally independent of one another: In one embodiment, a learning machine 30 is used for comparing the actual image IB to the one or the multiple reference images RB, i.e., in second step S2 in FIG. 2. Alternatively or additionally, in one embodiment additional reference images RB are produced by means of machine learning by the learning machine 30.

If a learning machine 30 is used for comparing the actual image IB to the one or the multiple reference images RB, it is designed, for example, in such a way that it independently identifies suitable features in the actual image IB to compare it to the reference images RB when the method is carried out repeatedly. The learning machine 30 is thus used for identifying features which characterize the component K in the actual image IB and in a reference image RB. These features are not necessarily previously known, but rather are in particular previously taught to the learning machine 30 in a training method. For this purpose, a large number of reference images RB having components K in a known state Z are transferred as training data to the learning machine 30. On the basis of the training data, the learning machine 30 identifies characteristic features for a respective component K in a respective state Z. These features are then used during the image comparison of the analysis unit 20 to determine the similarity of the actual image IB to a reference image RB.

If additional reference images RB are produced by means of a learning machine 30, it stores an actual image IB for the component K of which the state Z has been determined as an additional reference image RB for such a component K in just this state Z. The database 26 is thus progressively expanded with further reference images RB, so that the fault recognition progressively becomes more accurate.

The following is a summary list of reference numerals and the corresponding structure used in the above description of the invention:

2 hearing aid, hearing device
4 microphone opening
6 signal processing unit
8 receiver
10 earpiece
12 connecting line
14 housing
16 battery
18 individual device
20 analysis unit
22 camera
24 auxiliary device
26 database
28 system
30 learning machine
A instruction
IB actual image
F questionnaire
K component
RB reference image
S1 first step
S2 second step
S3 third step
Z state

The invention claimed is:

1. A method for fault recognition in a hearing aid of a user, the method comprising:
providing an actual image of a component of the hearing aid;
carrying out an image comparison with an analysis unit, by comparing the actual image with one or a plurality of reference images, wherein each reference image shows the component in a state that is previously known to show the component as being faulty or as being faultless;
determining with the analysis unit that the component, as shown in the actual image, is in a state which is assigned to the reference image that is most similar to the actual image, to thereby recognize whether the component is faulty or the component is faultless; and
recognizing an incorrect or defective connection of two components of the hearing aid as a fault, which is recognized with one of the reference images being an image of the two components having faultless connection or a faulty connection.

2. The method according to claim 1, wherein at least one of the plurality of reference images is an image of the component without a fault, showing the component in a faultless state, and which comprises, when the actual image corresponds to the at least one reference image, recognizing a no-fault situation and identifying the component as faultless.

3. The method according to claim 1, wherein at least one of the plurality of reference images is an image of the component having a given fault, showing the component in a faulty state, and which comprises, when the actual image corresponds to the at least one reference image, determining that a fault exists, and identifying the component as having the given fault.

4. The method according to claim 1, which comprises individually selecting a target component for the user from a set of different components, wherein at least one of the reference images is an image of the target component, and recognizing with the analysis unit that the component is faulty if the component does not correspond to the target component.

5. The method according to claim 1, wherein the component is an earpiece for insertion into an auditory canal of the user.

6. The method according to claim 1, wherein the component is a housing of the hearing aid and the housing has a microphone opening, and determining with the analysis unit whether or not the microphone opening is clogged.

7. The method according to claim 1, which comprises recognizing soiling of the component is recognized as a fault with one of the reference images being an image of the component in a clean state or in a soiled state.

8. The method according to claim 7, which comprises recognizing soiling of the component as soiling with cerumen.

9. The method according to claim 1, which comprises recognizing damage of the component as a fault with one of the reference images being an image of the component in an undamaged state or in a damaged state.

10. The method according to claim 1, which comprises comparing the actual image to the one or the plurality of reference images after an input has been accepted from the user in response to a questionnaire which indicates that a problem exists with the hearing aid.

11. The method according to claim 1, which comprises, if the component has been recognized as being faulty, outputting an instruction for correcting the state of the component to a user of the hearing aid.

12. The method according to claim 1, which comprises using a learning machine for comparing the actual image to the one or the plurality of reference images, or producing additional reference images with the learning machine.

13. The method according to claim 1, which comprises using a learning machine for comparing the actual image to the one or the plurality of reference images, and producing additional reference images with the learning machine.

14. A method for fault recognition in a hearing aid of a user, the method comprising:
providing an actual image of a component of the hearing aid;
carrying out an image comparison with an analysis unit, by comparing the actual image with one or a plurality of reference images, wherein each reference image shows the component in a state that is previously known to show the component as being faulty or as being faultless;
determining with the analysis unit that the component, as shown in the actual image, is in a state which is assigned to the reference image that is most similar to the actual image, to thereby recognize whether the component is faulty or the component is faultless; and repeatedly prompting the user with the analysis unit to record an actual image for a repeated fault recognition.

15. A method for fault recognition in a hearing aid of a user, the method comprising:

providing an actual image of a component of the hearing aid;

carrying out an image comparison with an analysis unit, by comparing the actual image with one or a plurality of reference images, wherein each reference image shows the component in a state that is previously known to show the component as being faulty or as being faultless;

determining with the analysis unit that the component, as shown in the actual image, is in a state which is assigned to the reference image that is most similar to the actual image, to thereby recognize whether the component is faulty or the component is faultless; and producing the actual image by way of a camera which is a part of a charging device of the hearing aid, and automatically producing the actual image when the hearing aid is connected to the charging device for charging.

16. A system, comprising an analysis unit configured to carry out the method according to claim 15.

* * * * *